United States Patent
Yoshikawa et al.

(10) Patent No.: US 12,202,496 B2
(45) Date of Patent: Jan. 21, 2025

(54) VEHICLE CONTROL APPARATUS

(71) Applicant: HONDA MOTOR CO., LTD., Tokyo (JP)

(72) Inventors: Fumiaki Yoshikawa, Tokyo (JP); Hisanori Yanagida, Tokyo (JP); Yuki Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 17/682,247

(22) Filed: Feb. 28, 2022

(65) Prior Publication Data
US 2022/0315022 A1 Oct. 6, 2022

(30) Foreign Application Priority Data
Mar. 31, 2021 (JP) .................. 2021-061929

(51) Int. Cl.
*B60W 10/18* (2012.01)
*B60W 10/04* (2006.01)
(Continued)

(52) U.S. Cl.
CPC .......... *B60W 50/038* (2013.01); *B60W 10/04* (2013.01); *B60W 10/18* (2013.01);
(Continued)

(58) Field of Classification Search
CPC .... B60W 50/038; B60W 10/04; B60W 10/18; B60W 50/0205; B60W 2710/18;
(Continued)

(56) References Cited

U.S. PATENT DOCUMENTS 4,926,955 A * 5/1990 Ohmura ................. B62D 7/148
701/43
5,791,427 A * 8/1998 Yamaguchi ............... B60L 7/14
903/910
(Continued)

FOREIGN PATENT DOCUMENTS

CN 104340175 B * 10/2016 ............. B60K 28/04
DE 602005003617 T2 * 4/2008 ........... B60K 17/344
(Continued)

*Primary Examiner* — B M M Hannan
(74) *Attorney, Agent, or Firm* — Rankin, Hill & Clark LLP

(57) ABSTRACT

A vehicle control apparatus that provides control over a brake device or a power plant device of a host vehicle includes: an information acquisition part configured to acquire information on state of the brake device and the power plant device and information on front wheel steering angle; a determination part configured to determine whether or not an abnormality has occurred in a turnability improvement control; a deceleration force computation part configured to compute a required deceleration force; and a coordinated control part configured to perform a coordinated control in which a distribution ratio between a brake deceleration force of the brake device and a power plant deceleration force of the power plant device is adjusted. When an abnormality has occurred in the turnability improvement control, a sum of the brake deceleration force and the power plant deceleration force is degenerated according to a prescribed time rate of change.

6 Claims, 3 Drawing Sheets

(51) Int. Cl.
  *B60W 50/02* (2012.01)
  *B60W 50/038* (2012.01)
  *G07C 5/02* (2006.01)

(52) U.S. Cl.
  CPC ........... *B60W 50/0205* (2013.01); *G07C 5/02* (2013.01); *B60W 2710/18* (2013.01); *B60W 2720/106* (2013.01)

(58) Field of Classification Search
  CPC ..... B60W 2720/106; B60W 2510/083; B60W 2510/182; B60W 2540/18; B60W 2710/083; B60W 2710/182; B60W 10/08; B60W 10/184; B60W 30/045; G07C 5/02
  USPC .................. 701/70, 72, 78–79, 83, 41, 29.2
  See application file for complete search history.

(56) References Cited

U.S. PATENT DOCUMENTS

| | | | | |
|---|---|---|---|---|
| 2004/0098186 | A1* | 5/2004 | Watanabe | B60T 8/56 701/72 |
| 2005/0071071 | A1* | 3/2005 | Nagata | B60T 7/22 701/70 |
| 2007/0205735 | A1* | 9/2007 | Kiuchi | B60W 30/18127 318/432 |
| 2012/0235853 | A1* | 9/2012 | Takeuchi | B60W 30/0953 701/70 |
| 2017/0166210 | A1* | 6/2017 | Kim | B60W 30/18027 |
| 2017/0232973 | A1* | 8/2017 | Otake | B60W 30/12 701/43 |
| 2018/0043873 | A1* | 2/2018 | Tanimoto | B60T 8/44 |
| 2018/0082567 | A1* | 3/2018 | Park | H02K 11/20 |
| 2020/0198637 | A1 | 6/2020 | Okubo et al. | |
| 2021/0237748 | A1* | 8/2021 | Dakemoto | B60W 50/06 |
| 2022/0080942 | A1* | 3/2022 | Eberl | B60W 50/10 |
| 2022/0266906 | A1* | 8/2022 | Kurokawa | B60W 50/023 |
| 2022/0297645 | A1* | 9/2022 | Yanagida | B60T 13/662 |

FOREIGN PATENT DOCUMENTS

| | | | | |
|---|---|---|---|---|
| JP | H05105048 | A | * | 4/1993 |
| JP | H1149019 | A | * | 2/1999 |
| JP | H11147411 | A | * | 6/1999 |
| JP | 3702749 | B2 | * | 10/2005 ............... B60K 6/28 |
| JP | 3895641 | B2 | * | 3/2007 ........... B60R 21/013 |
| JP | 4387607 | B2 | * | 12/2009 |
| JP | 4532007 | B2 | * | 8/2010 |
| JP | 2015009567 | A | * | 1/2015 |
| JP | 2015-110378 | A | | 6/2015 |
| JP | 6395789 | B2 | * | 9/2018 |
| JP | 2020-100320 | A | | 7/2020 |
| JP | 2022052184 | A | * | 4/2022 |
| KR | 20190119295 | A | * | 10/2019 |

* cited by examiner

VEHICLE CONTROL APPARATUS

CROSS REFERENCE TO RELATED APPLICATIONS

This application claims the benefit of Japanese Patent Application No. 2021-061929 filed on Mar. 31, 2021, the disclosure of which is incorporated herein by reference.

BACKGROUND OF THE INVENTION

1. Field of the Invention

The present invention relates to vehicle control apparatus having a function of increasing turnability of a vehicle.

2. Description of the Related Art

The applicant of the present invention has disclosed an invention of a vehicle control apparatus capable of increasing turnability of a vehicle by performing a turnability improvement control that: provides control over a brake device and a power plant device of the vehicle; and gives a deceleration force to the vehicle, irrespective of a brake operation by a driver of the vehicle (see Patent Document 1).

The vehicle control apparatus of Patent Document 1 includes: a vehicle state detection device for acquiring vehicle state information including a front wheel steering angle; an additional pitch moment calculation unit for calculating additional pitch moment to be added to the vehicle based on the vehicle state information; an additional deceleration force calculation unit for calculating additional deceleration force with a deceleration side as a negative value to be generated in the vehicle based on the additional pitch moment; a deceleration force distribution unit for calculating brake additional deceleration force to be generated by the brake and power plant additional deceleration force to be generated by the power plant based on the additional deceleration force and state information on the brake and the power plant.

The vehicle control apparatus according to Patent Document 1 can improve turning performance of a vehicle, regardless of brake operation by a driver of the vehicle, by performing a turnability improvement control in which a deceleration force is given to the vehicle and can appropriately select a device to generate the deceleration force.

RELATED ART DOCUMENT

Patent Document

[Patent Document 1] Japanese Laid-Open Patent Application, Publication No. 2020-100320 (to be referred to as Patent Document 1 hereinafter)

SUMMARY OF THE INVENTION

In a vehicle control apparatus that provides control over a brake device and a power plant device of a vehicle, an abnormality may occur in the control over the brake device or the power plant device during execution of a turnability improvement control. In that case, there is a possibility that a control over the brake device or the power plant device may fail to work properly, such as a malfunction of control over the vehicle control apparatus due to the abnormality as described above, which may result in a disturbance in behavior of the vehicle.

The vehicle control apparatus according to Patent Document 1 fails to, however, teach or suggest how to quickly suppress a disturbance in behavior of the vehicle, when an abnormality has occurred in a control over the brake device or the power plant device during execution of the turnability improvement control.

Thus, there is still a need for improvement in the vehicle control apparatus of Patent Document 1 in how to deal with a case in which an abnormality has occurred in a control over the brake device or the power plant device during execution of the turnability improvement control.

In light of the described above, the present invention has been made in an attempt to provide a vehicle control apparatus capable of quickly suppressing a disturbance in behavior of a vehicle, even when an abnormality has occurred in a control over the brake device or the power plant device during execution of the turnability improvement control.

A vehicle control apparatus that provides control over a brake device or a power plant device of a host vehicle includes: an information acquisition part configured to acquire information on state of the brake device and the power plant device and information on front wheel steering angle of the vehicle; a determination part configured to determine whether or not an abnormality has occurred in a turnability improvement control including a control over the brake device or the power plant device; a deceleration force computation part configured to compute a required deceleration force to be generated in the vehicle, based on the vehicle state information; and a coordinated control part configured to perform a coordinated control in which a distribution ratio between a brake deceleration force of the brake device and a power plant deceleration force of the power plant device is adjusted based on the required deceleration force and the state information on the brake device and the power plant device. When the determination part determines that an abnormality has occurred in the turnability improvement control, the coordinated control part is configured to perform a coordinated control such that a sum of the brake deceleration force and the power plant deceleration force is degenerated according to a prescribed time rate of change.

The vehicle control apparatus of the present invention can quickly suppress a disturbance in behavior of a vehicle and realize a smooth vehicle control without making an occupant (s) of a host vehicle feel uncomfortable, even when an abnormality has occurred in a turnability improvement control including a control over a brake device or a power plant of the vehicle during execution of the turnability improvement control.

DETAILED DESCRIPTION OF THE EMBODIMENTS

A vehicle control apparatus according to an embodiment of the present invention is described in detail with reference to the related drawings as appropriate.

Note that, in the related drawings, common reference symbols are used in principle for members having a common function or for members having corresponding functions. Further, for convenience of description, sizes or shapes of the members may be schematically represented by deformation or exaggeration.

<Overview of Vehicle Control Apparatus 11 According to Embodiment of the Present Invention>

Figure 1:
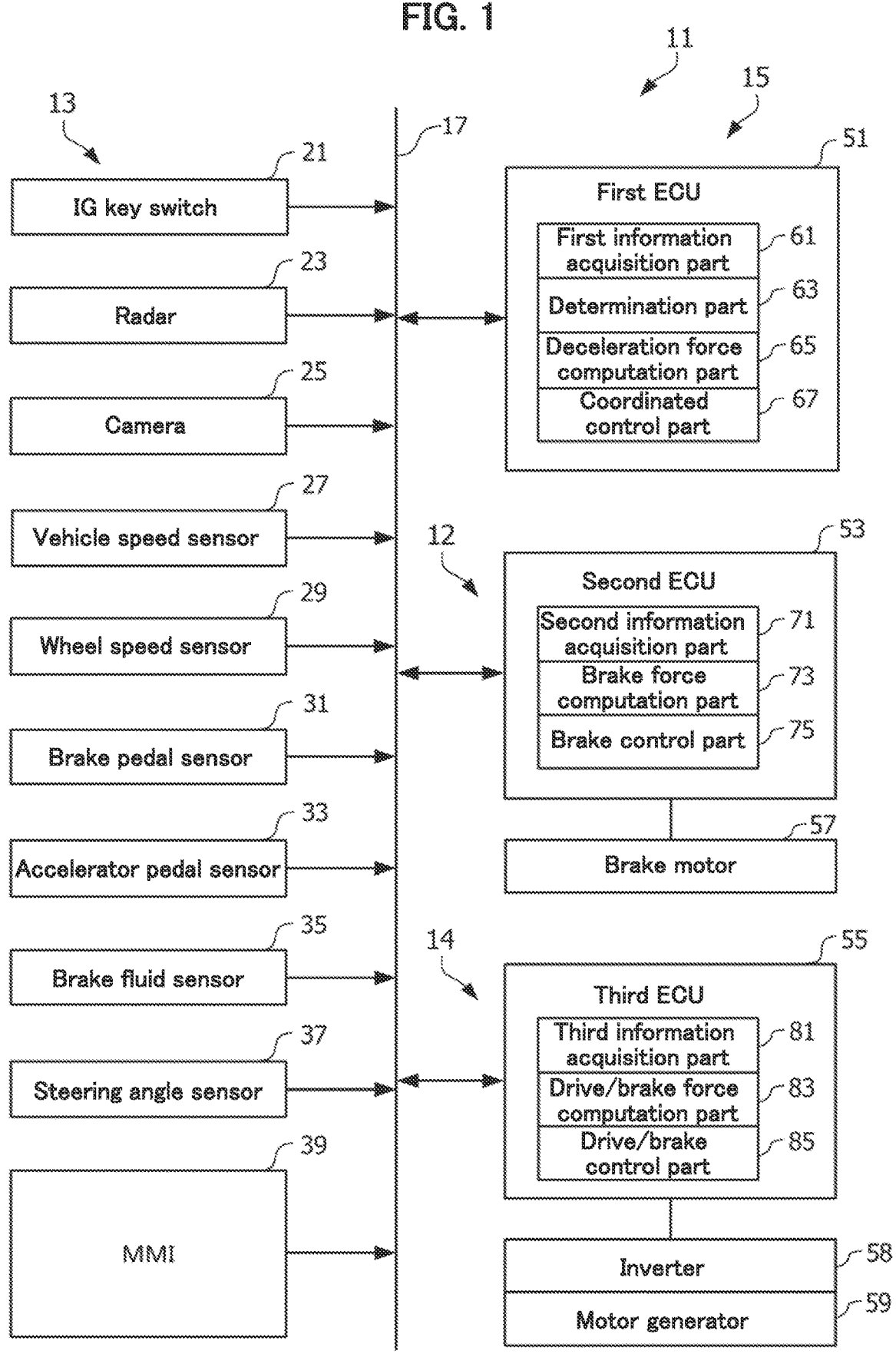
FIG. 1 is a block diagram illustrating an overview of a vehicle control apparatus according to an embodiment of the present invention.

An overview of a vehicle control apparatus 11 according to the embodiment of the present invention is described with reference to FIG. 1. FIG. 1 is a block illustrating the overview of the vehicle control apparatus 11 according to the embodiment of the present invention.

As illustrated in FIG. 1, even when an abnormality occurs in a control over a brake device 12 and a power plant device 14 of a host vehicle of interest during execution of a turnability improvement control, the vehicle control apparatus 11 according to the embodiment of the present invention has a function of realizing a smooth vehicle control without making an occupant(s) of the vehicle feel uncomfortable by quickly suppressing disruption in behavior of the vehicle.

The turnability improvement control used herein means a control in which, with or without a brake operation by a driver of the vehicle, a deceleration force (a brake force) according to a steering angle is given to the vehicle so as to generate a load shift to a front wheel, to thereby improve turnability at a time of a steering travel.

The vehicle control apparatus 11 according to the embodiment of the present invention is applied to, for example, an electric vehicle equipped with an inverter 58 and a motor generator 59, as a power plant device 14.

Respective structures of the brake device 12 and the power plant device 14 will be hereinafter described in detail.

In order to realize the above-mentioned functions, the vehicle control apparatus 11 according to the embodiment of the present invention is configured such that, as illustrated in FIG. 1, input system elements 13 and output system elements 15 are connected to each other so as to be capable of data communication through a communication medium 17 such as, for example, a controller area network (CAN).

As illustrated in FIG. 1, the input system elements 13 include an ignition key switch (an IG key switch) 21, a radar 23, a camera 25, a vehicle speed sensor 27, a wheel speed sensor 29, a brake pedal sensor 31, an accelerator pedal sensor 33, a brake fluid pressure sensor 35, a yaw rate sensor not illustrated, a G sensor not illustrated, and a MMI (Man-Machine Interface) 39.

Also as illustrated in FIG. 1, the output system elements 15 include: a first ECU 51 that has a function of providing instructions on turnability improvement control; a second ECU 53 that has a function of providing instructions on a brake control over a vehicle; and a third ECU 55 that has a function of providing instructions on brake and drive control over the vehicle.

The ignition (IG) key switch 21 is a switch operated to supply a power source to each of electrical components (not illustrated) mounted in the vehicle via an on-board secondary battery (not illustrated). When the IG key switch 21 is turned ON, power is supplied to each of the first ECU 51, the second ECU 53, and the third ECU 55, to thereby start the ECUs 51, 53, and 55, respectively.

The radar 23: emits radar waves to a target object including a vehicle ahead which is a vehicle travelling in front of the host vehicle; and receives the radar waves reflected by the target object, to thereby acquire distribution information on target object including a distance thereto or a cardinal direction thereof. The radar waves suitably used herein include laser, microwaves, milliwaves, and supersonic waves. The distribution information on the target object detected by the radar 23 is transmitted to the first to third ECUs 51, 53, 55 or the like via the communication medium 17.

The camera 23 has a function of taking an image of a surrounding area of the host vehicle including that in a traveling direction thereof. The camera 25 suitably used herein includes, for example, a CMOS (Complementary Metal Oxide Semiconductor) camera and a CCD (Charge Coupled Device) camera. Information on the image of the surrounding area of the host vehicle taken by the camera 25 is transmitted to the first to third ECUs 51, 53, 55 or the like via the communication medium 17.

The vehicle speed sensor 27 has a function of detecting a traveling speed of the vehicle (a vehicle speed). Information on the vehicle speed detected by the vehicle speed sensor 27 is transmitted to the first to third ECUs 51, 53, 55 or the like via the communication medium 17.

The wheel speed sensor 29 has a function of detecting a rotation speed (a wheel speed) of each wheel (not illustrated) provided in the host vehicle. Information on the wheel speeds of the respective wheels detected by the wheel speed sensor 29 is sent to the first to third ECUs 51, 53, 55 or the like via the communication medium 17.

The brake pedal sensor 31 has a function of detecting an operation amount of a brake pedal (not illustrated) by a driver of the vehicle, and an operation torque. Information on the operation amount of the brake pedal and the operation torque each detected by the brake pedal sensor 31 is transmitted to the first ECU 51, the third ECU 55, or the like, via the communication medium 17.

The accelerator pedal sensor 33 has a function of detecting an operation amount of an accelerator pedal (not illustrated) by the driver. Information on the operation amount of the accelerator pedal detected by the accelerator pedal sensor 33 is transmitted to the first ECU 51, the second ECU 53, or the like, via the communication medium 17.

The brake fluid pressure sensor 35 has a function of detecting a brake fluid pressure in a fluid supply path of a brake fluid pressure system. Information on the fluid pressure in the fluid supply path detected by the brake fluid pressure sensor 35 is transmitted to the first ECU 51, the third ECU 55, or the like, via the communication medium 17.

The steering angle sensor 37 has a function of detecting a steering angle of a front wheel (not illustrated) of the host vehicle. Information on the steering angle of the front wheel detected by the steering angle sensor 37 is transmitted to the first ECU 51 or the like via the communication medium 17.

The yaw rate sensor (not illustrated) has a function of detecting a yaw rate generated in the host vehicle. Information on the yaw rate detected by the yaw rate sensor is transmitted to the first ECU 51 or the like via the communication medium 17.

The G sensor (not illustrated) has a function of detecting a longitudinal direction G (a longitudinal direction acceleration/deceleration) and a lateral direction G (a lateral direction acceleration/deceleration) generated in the host vehicle. Information on the longitudinal direction G and the lateral direction G of the host vehicle detected by the G sensor is transmitted to the first ECU 51 or the like via the communication medium 17.

The MMI (Man-Machine Interface) 39 includes an operation switch not illustrated for controlling turnability improvement (TI) (to be hereinafter referred to as a "TI operation switch"). The TI operation switch is used when ON/Off setting information concerning the turnability improvement control is operated or inputted. The ON/OFF setting information concerning the turnability improvement control operated or inputted using the TI operation switch is transmitted to the first ECU 51 or the like via the communication medium 17.

Note that implementation of the turnability improvement control starts triggered by a steering angle of the front wheel exceeding a prescribed steering angle threshold, while the TI operation switch is turned ON. In the turnability improvement control, when an abnormality thereof including control over a sensor, the brake device 12 or the power plant device 14 occurs, coordinated control is performed in which a sum of a brake deceleration force and a power plant deceleration force on the turnability improvement control is degenerated according to a prescribed time rate of change. Details will be described hereinafter.

The output system elements 15 are described next.

The first ECU 51 included in the output system elements 15 has a function of providing an instruction to perform a turnability improvement control. In order to realize the function, as illustrated in FIG. 1, the first ECU 51 includes a first information acquisition part 61, a determination part 63, a deceleration force computation part 65, and a coordinated control part 67.

The first ECU 51 is configured using a microcomputer including a CPU (Central Processing Unit), a ROM (Read Only Memory), a RAM (Random Access Memory), or the like. The microcomputer reads and executes programs and data stored in the ROM and operates to control execution of various functions of the first ECU 51.

The first ECU 51 has various functions including: a function of acquiring information of various types including information on state of each of the brake device 12 and the power plant device 14, information on steering angle of the steering angle sensor 37, and information on on/off setting of a TI operation switch; a function of determining whether or not a steering angle of a front wheel exceeds a prescribed steering angle threshold, or whether or not an abnormality occurs in a turnability improvement control including a control over a sensor, the brake device 12, or the power plant device 14; a function of, when the front wheel steering angle exceeds the prescribed steering angle threshold, computing a required deceleration force to be generated in a host vehicle, based on information on the front wheel steering angle; and, during execution of the turnability improvement control, when an abnormality has occurred in the turnability improvement control including the control over the sensor, the brake device 12, or the power plant device 14, a function of setting a prescribed time rate of change so as to reduce a sum of a brake deceleration force and a power plant deceleration force of the turnability improvement control; a function of adjusting an distribution ratio between the brake deceleration force and the power plant deceleration force; and a function of performing a coordinated control such that a sum of the brake deceleration force and the power plant deceleration force be degenerated according to a prescribed time rate of change.

The first information acquisition part 61 included in the first ECU 51 acquires information of various types including: information on state of each of the brake device 12 and the power plant device 14; information on steering angle of the steering angle sensor 37; and information on ON/OFF setting regarding a turnability improvement control inputted via the TI operation switch of the MMI 39.

The first information acquisition part 61 also acquires: information on vehicle speed detected by the vehicle speed sensor 27; information on wheel speed of each of wheels of a host vehicle, detected by the wheel speed sensor 29; information on an operation amount and an operation torque of a brake pedal, detected by the brake pedal sensor 31; information on an operation amount of an accelerator pedal detected by the accelerator pedal sensor 33; information on brake fluid pressure in a fluid supply path detected by the brake fluid pressure sensor 35; and information on front wheel steering angle detected by the steering angle sensor 37.

The information of various types acquired by the first information acquisition part 61 is transmitted to the determination part 63.

The determination part 63 determines whether or not an abnormality has occurred in a turnability improvement control including whether or not the front wheel steering angle exceeds a prescribed steering angle threshold and a control over the brake device 12 or the power plant device 14.

The prescribed steering angle threshold may be determined as a lower limit of a front wheel steering angle at which the vehicle during a turning operation requires stabilization of a behavior thereof. Note that the prescribed steering angle threshold to be set may be flexibly changed depending on a vehicle speed, such that, for example, the higher the vehicle speed, the lower the threshold to be set.

Regarding whether or not an abnormality has occurred in a turnability improvement control including a control over the brake device 12 or the power plant device 14, the determination part 63 may determine that an abnormality has occurred therein when, for example, a difference between a target brake force and an actual brake force has exceeded a prescribed brake force threshold for a prescribed period of time, or when a difference between a target drive force and an actual drive force has exceeded a prescribed drive force threshold for a prescribed period of time.

A result determined by the determination part 63 is transmitted to the deceleration force computation part 65.

When the determination part 63 determines that the front wheel steering angle has exceeded the prescribed steering angle threshold, the deceleration force computation part 65 computes a required deceleration force to be generated in the vehicle, based on information on the front wheel steering angle. Actually, however, the deceleration force computation part 65: computes a required deceleration at first, based on information on vehicle state including the front wheel steering angle; and then computes a required deceleration force to be generated in the vehicle, based on the required deceleration computed as described above. A procedure of computing such a required deceleration force (an added deceleration force) is described in Patent Document 1, paragraphs 0031 to 0048.

During execution of a turnability improvement control, if the determination part 63 determines that an abnormality has occurred in the turnability improvement control including a control over the brake device 12 or the power plant device 14, the deceleration force computation part 65 sets a prescribed time rate of change so as to reduce a sum of a brake deceleration force and a power plant deceleration force in the turnability improvement control. The prescribed time rate of change is set to have such a characteristic that a deceleration of the vehicle is converged to zero over time while drawing a linear trajectory, as illustrated in "Degeneration Zone" from time t1 to t3 of temporal characteristics of "Acceleration and Deceleration of Vehicle" in FIG. 3.

Note that a change characteristic of the time rate of change may be appropriately set depending on a speed of the vehicle, such as, for example, the higher the vehicle speed, the smaller a slope of the change characteristic of the deceleration over time.

A result computed and a content set by the deceleration force computation part 65 is transmitted to the coordinated control part 67.

The coordinated control part 67 performs a coordinated control in which a distribution ratio between a brake deceleration force of the brake device 12 and a power plant deceleration force of the power plant device 14 is adjusted, based on a required deceleration force as the result computed by the deceleration force computation part 65, and the state information on the brake device 12 and the power plant device 14.

During execution of a turnability improvement control, when the determination part 63 determines that an abnormality has occurred in the control over the brake device 12 or the power plant device 14, the coordinated control part 67 performs such a coordinated control that a sum of the brake deceleration force of the brake device 12 and the power plant deceleration force of the power plant device 14 be degenerated according to a prescribed time rate of change (accompanied by degeneration of the turnability improvement control).

Information on instructions of the coordinated control created by the coordinated control part 67 (accompanied by degeneration of the turnability improvement control) is transmitted to each of the second and the third ECUs 53, 55, via the communication medium 17.

The second ECU 53 included in the output system elements 15 has a function of providing an instruction on a brake control over the host vehicle. In order to realize the function, as illustrated in FIG. 1, the second ECU 53 includes a second information acquisition part 71, a brake force computation part 73, and a brake control part 75.

The second ECU 53 is configured using, similarly to the first ECU 51, a microcomputer including a CPU, a ROM, a RAM, or the like. The microcomputer reads and executes programs and data stored in the ROM and operates to control execution of various functions of the second ECU 53.

The second ECU 53 has various functions including: a function of acquiring information of various types including information on an operation amount and an operation torque of a brake pedal detected by the brake pedal sensor 31; a function of computing a target brake force based on an operation amount or the like of the brake pedal; and a function of performing a brake control of the host vehicle using a brake deceleration force in accordance with the computed target brake force.

The second information acquisition part 71 included in the second ECU 53 acquires information of various types including: information on vehicle speed detected by the vehicle speed sensor 27; information on wheel speed of each of wheels of the vehicle, detected by the wheel speed sensor 29; information on an operation amount and an operation torque of the brake pedal, detected by the brake pedal sensor 31; and information on instructions of a coordinated control created by the coordinated control part 67 included in the first ECU 51 (accompanied by degeneration of the turnability improvement control).

Information of various types acquired by the second information acquisition part 71 is transmitted to the brake force computation part 73.

The brake force computation part 73 computes a target brake force based on an operation amount of the brake pedal or the like.

Information on the target brake force computed by the brake force computation part 73 is transmitted to the brake control part 75.

The brake control part 75 performs a brake control over the host vehicle, basically using a brake deceleration force in accordance with the target brake force computed by the brake force computation part 73.

More specifically, the brake control part 75 makes a motor cylinder device (see, for example, Japanese Laid-Open Patent Application, Publication No. 2015-110378) operate by driving the brake motor 57, in accordance with a brake fluid pressure generated in a master cylinder (a primary fluid pressure), to thereby generate a brake fluid pressure (a secondary fluid pressure) which acts on a brake caliper (not illustrated).

When the brake control part 75 receives information on instructions of a coordinated control (accompanied by degeneration of the turnability improvement control), however, the brake control part 75 performs a brake control of the host vehicle, using a brake deceleration force in accordance with a required brake force based on the information on instructions of the coordinated control.

The third ECU 55 included in the output system elements 15 has a function of providing an instruction of a brake and drive control over the vehicle. In order to realize the function, as illustrated in FIG. 1, the third ECU 55 includes a third information acquisition part 81, a drive/brake force computation part 83, and a drive/brake control part 85.

The third ECU 55 is configured using, similarly to the first ECU 51 and the second ECU 53, a microcomputer including a CPU, a ROM, a RAM, or the like. The microcomputer reads and executes programs and data stored in the ROM and operates to control execution of various functions of the third ECU 55.

The third ECU 55 has various functions including: a function of acquiring information of various types including an operation amount and an operation torque of an accelerator pedal detected by the accelerator pedal sensor 33; a function of computing a target brake and drive force based on the operation amount or the like of the accelerator pedal; and a function of performing a brake and drive control over the host vehicle using a power plant acceleration/deceleration force in accordance with the computed brake and drive force.

The third information acquisition part 81 included in the third ECU 55 acquires information of various types including: information on vehicle speed detected by the vehicle speed sensor 27; information on wheel speed of each of wheels of the vehicle, detected by the wheel speed sensor 29; information on an operation amount and an operation torque of an accelerator pedal, detected by the accelerator pedal sensor 33; information on rotation speed of the motor generator 59; and information on instructions of a coordinated control, generated by the coordinated control part 67 included in the first ECU 51 (accompanied by degeneration of the turnability improvement control).

The information of various types acquired by the third information acquisition part 81 is transmitted to the drive/brake force computation part 83.

The drive/brake force computation part 83 computes a target brake and drive force (a target acceleration/deceleration force), based on the vehicle speed, the wheel speed, the operation amount of the accelerator pedal, the rotation speed of the motor generator 59, or the like.

Information on the target brake and drive force computed by the drive/brake force computation part 83 is transmitted to the drive/brake control part 85.

The drive/brake control part 85 performs a brake and drive control over the host vehicle, basically using a power plant acceleration/deceleration force in accordance with the target brake and drive force computed by the drive/brake force computation part 83.

More specifically, the drive/brake control part 85 brakes and drives the motor generator 59 via the inverter 58 based on the target brake and drive force, to thereby provide the vehicle with the power plant acceleration/deceleration force.

When the brake control part 75 receives information on instructions of a coordinated control (accompanied by degeneration of the turnability improvement control), however, the brake control part 75 performs a brake control of the host vehicle, using a power plant deceleration force in accordance with a required brake force based on the information on instructions of the coordinated control.

<Operations of Vehicle Control Apparatus 11 According to Embodiment of the Present Invention>

Figure 2:
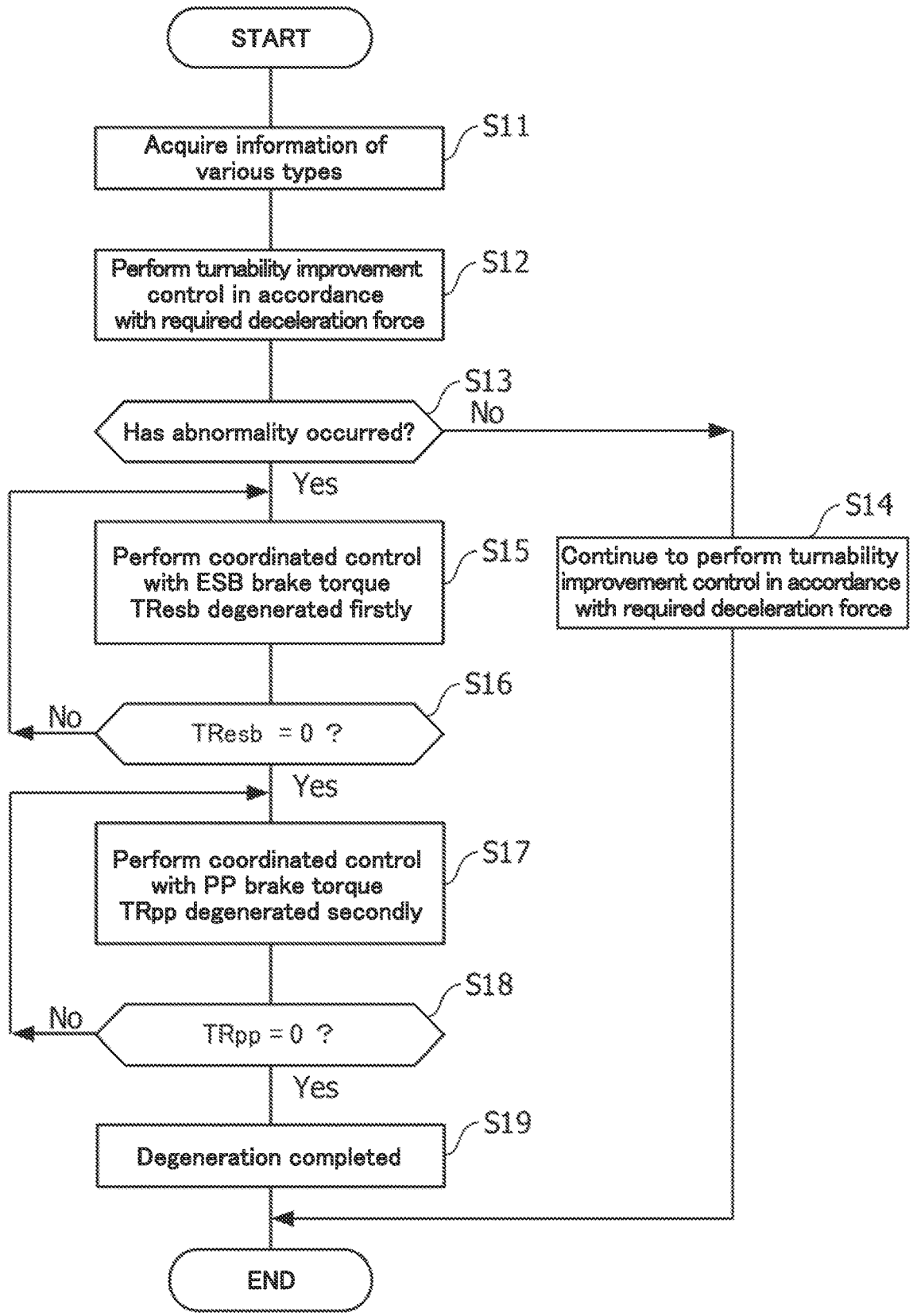
FIG. 2 is a flowchart for explaining operations of the vehicle control apparatus according to the embodiment of the present invention.

Operations of the vehicle control apparatus 11 according to the embodiment of the present invention are described next with reference to FIG. 2. FIG. 2 is a flowchart for explaining the operations of the vehicle control apparatus 11 according to the embodiment of the present invention.

It is assumed in the explanation below that: the host vehicle is currently traveling and turning; a front wheel steering angle thereof has exceeded a prescribed steering angle threshold; and the TI operation switch is set to ON.

In step S11 illustrated in FIG. 2, the first information acquisition part 61 included in the first ECU 51 acquires information of various types including information on state of the brake device 12 and the power plant device 14 and on a vehicle speed. The information on state of the brake device 12 and the power plant device 14 used herein is information including that on a brake deceleration force of the brake device 12 and a power plant deceleration force of the power plant device 14.

In step S12, the coordinated control part 67 included in the first ECU 51 performs a turnability improvement control in accordance with a required deceleration force, based on a required deceleration force as a result computed by the deceleration force computation part 65 and the state information on the brake device 12 and the power plant device 14. At this time, the coordinated control part 67 performs a coordinated control in which an allocation of a brake deceleration force of the brake device 12 and a power plant deceleration force of the power plant device 14.

In step S13, the determination part 63 included in the first ECU 51 determines whether or not an abnormality has occurred in the turnability improvement control including a control over the brake device 12 or the power plant device 14.

As a result of the determination in step S13, if an abnormality is not determined to have occurred in the turnability improvement control, the first ECU 51 advances a flow of the processing to the next step S14.

On the other hand, as the result of the determination in step S13, if an abnormality is determined to have occurred in the turnability improvement control, the first ECU 51 makes the flow of the processing jump to step S15.

In step S14, the coordinated control part 67 included in the first ECU 51 continues to perform the turnability improvement control in accordance with the required deceleration force which is a result computed by the deceleration force computation part 65. After completion of step S14, the first ECU 51 terminates the flow of the processing.

Figure 3:
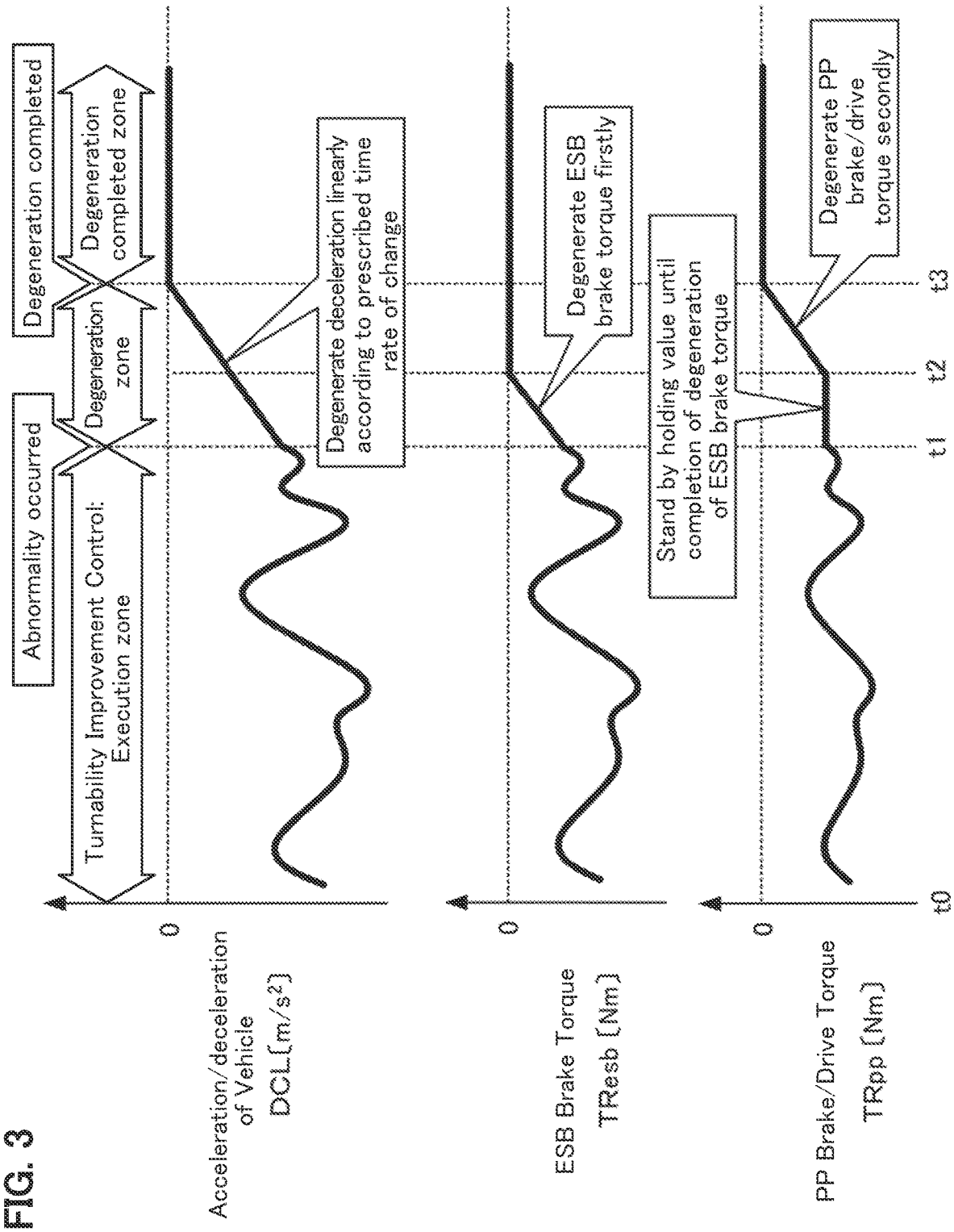
FIG. 3 is a time chart for explaining operations of the vehicle control apparatus and illustrating respective temporal changes in an acceleration/deceleration speed, an ESB (Electric Servo Brake system) brake torque, and a brake and drive torque of a vehicle according to the embodiment of the present invention.

In step S15, the coordinated control part 67 included in the first ECU 51 performs a coordinated control such that a sum of a brake deceleration force and a power plant deceleration force is degenerated according to a prescribed time rate of change (accompanied by degeneration of the turnability improvement control), starting at a point of time at which an abnormality is determined to have occurred in the turnability improvement control for the first time (see time t1 in FIG. 3).

More specifically, the coordinated control part 67 included in the first ECU 51 performs the coordinated control in which an ESB brake torque TResb of the brake deceleration force is firstly degenerated, ahead of a PP brake torque TRpp of the power plant deceleration force.

In step S16, the determination part 63 included in the first ECU 51 determines whether or not the ESB brake torque TResb of the brake deceleration force has converged to zero (TResb=0?).

As a result of the determination in step S16, if the ESB brake torque TResb is not determined to have been converged to zero, the first ECU 51 returns the flow of the processing to step S15, and the processing restarts therefrom.

On the other hand, as the result of the determination in step S16, if the ESB brake torque TResb is determined to have been converged to zero, the first ECU 51 advances the flow of the processing to the next step S17.

In step S17, the coordinated control part 67 included in the first ECU 51 performs a coordinated control such that a sum of a brake deceleration force and a power plant deceleration force is degenerated according to a prescribed time rate of change (accompanied by degeneration of the turnability improvement control), starting at a point of time at which the ESB brake torque TResb is converged to zero (see time t2 in FIG. 3).

More specifically, the coordinated control part 67 included in the first ECU 51 performs the coordinated control in which the PP brake torque TRpp of the power plant deceleration force is secondly degenerated after the brake deceleration force of the ESB brake torque TResb.

In step S18, the determination part 63 included in the first ECU 51 determines whether or not the PP brake torque TRpp of the power plant deceleration force has been converged to zero (TRpp=0?).

As a result of the determination in step S18, if the PP brake torque TRpp is not determined to have been converged to zero, the first ECU 51 returns the flow of the processing to step S17 and makes the processing continue the following steps.

On the other hand, as the result of the determination in step S18, the PP brake torque TRpp is determined to have been converged to zero, the first ECU 51 advances the flow of the processing to the next step S19.

In step S19, the first ECU 51 determines that degeneration of the turnability improvement control has been completed and terminates the flow of the processing.

<Time-Series Operations of Vehicle Control Apparatus 11 According to Embodiment of the Present Invention>

Time-series operations of the vehicle control apparatus 11 according to the embodiment of the present invention are described next with reference to FIG. 3. FIG. 3 is a time chart for explaining operations of the vehicle control apparatus 11 and illustrating respective temporal changes of an acceleration/deceleration DCL, an ESB brake torque TResb, and a PP brake and drive torque TRpp of the vehicle.

During a time period from time t0 to time t3 illustrated in FIG. 3, the acceleration/deceleration DCL of the vehicle shows a deceleration of a negative value smaller than zero. During a time period from time t0 to time t2 illustrated in FIG. 3, the ESB brake torque TResb also shows a deceleration of a negative value smaller than zero. Similarly, during a time period from time t0 to time t3 illustrated in FIG. 3, the PP brake torque TRpp shows a deceleration of a negative value smaller than zero.

During a time period from time t0 to a time immediately before time t1 (an execution zone of the turnability improvement control), the acceleration/deceleration DCL of the vehicle has a negative value in accordance with a required deceleration of the turnability improvement control. During the time period from time t0 to time t1, the ESB brake torque TResb and the PP brake torque TRpp has such a change characteristic which is a result obtained by multiplying the required deceleration force (a required brake torque) by respective distribution ratios of the brake deceleration force (the ESB brake torque TResb) and the power plant deceleration force (the PP brake torque TRpp) which have already been adjusted by the coordinated control part 67 included in the first ECU 51, respectively.

At time t1, an abnormality has occurred in a control over the brake device 12 or the power plant device 14.

Also at time t1, the acceleration/deceleration DCL (t1) of the vehicle is distributed to the ESB brake torque TResb (t1) and the PP brake torque TRpp (t1)<DCL (t1)=TResb (t1)+TRpp (t1)>.

During a time period from time t1 to time t3 (the degeneration zone of the turnability improvement control), the acceleration/deceleration DCL of the vehicle shows such a change characteristic that a deceleration is degenerated so as to linearly converge to zero according to a prescribed time rate of change.

During a first half of the time period from time t1 to time t3, which is a time period from time t1 to time t2, the ESB brake torque TResb shows a change characteristic of firstly being degenerated ahead of the PP brake torque TRpp, from TResb (t1) to TResb (t2) in a course of the linear convergence to zero, in accordance with a change characteristic common to the time rate of change of the acceleration/deceleration DCL of the vehicle.

During the first half of the time period from time t1 to time t3, which is the time period from time t1 to time t2, the PP brake torque TRpp stands by and a value TRpp (t1) is held until the degeneration of the ESB brake torque TResb is completed <TRpp (t1)=TRpp (t2)>.

At time t2, the ESB brake torque TResb (t2) has converged to zero.

At time t2, the acceleration/deceleration DCL (t2) of the vehicle is distributed to the ESB brake torque TResb (t2) and the PP brake torque TRpp (t2)<DCL (t2)=TResb (t2)+TRpp (t2)>. At this time, however, <TResb (t2)=0>, which results in <DCL (t2)=TRpp (t2)>.

During a latter half of the time period from time t1 to time t3, which is a time period from time t2 to time t3 (the degeneration zone of the turnability improvement control), the PP brake torque TRpp shows a change characteristic of secondly being degenerated after the ESB brake torque TResb, from TRpp (t2) to TRpp (t3) in a course of the linear convergence to zero, in accordance with a change characteristic common to the time rate of change of the acceleration/deceleration DCL of the vehicle.

During the latter half of the time period from time t1 to t3, which is the time period from time t2 to time t3, the ESB brake torque TResb keeps a state of convergence to zero <TResb (t2)=TResb (t3)=0>.

At time t3, degeneration of the turnability improvement control has been completed. Consequently, at time t3, each of respective values of the acceleration/deceleration DCL (t3), ESB brake torque TResb (t3), and PP brake torque TRpp of the vehicle is converged to zero.

After time t3 (a degeneration completed zone of the turnability improvement control), each of the respective values of the acceleration/deceleration DCL, the ESB brake torque TResb, and the PP brake torque TRpp of the vehicle is kept at zero.

Advantageous Effects of Vehicle Control Apparatus 11 According to Embodiment of the Present Invention Advantageous effects of the vehicle control apparatus 11 according to the embodiment of the present invention are described next.

The vehicle control apparatus 11 according to a first aspect of the present invention is the vehicle control apparatus 11 that performs a control over the brake device 12 or the power plant device 14 of a host vehicle. The vehicle control apparatus 11 includes: an information acquisition part (which may also be referred to as the first information acquisition part 61) configured to acquire information on state of the brake device 12 and the power plant device 14 of the vehicle, and information on vehicle state including that on front wheel steering angle thereof; the determination part 63 configured to determine whether or not an abnormality occurs in a turnability improvement control including a control over the brake device 12 or the power plant device 14; the deceleration force computation part 65 configured to compute a required deceleration force to be generated in the vehicle based on the state information; and the coordinated control part 67 configured to perform a coordinated control in which a distribution ratio between a brake deceleration force of the brake device 12 (the ESB brake torque TResb) and a power plant deceleration force of the power plant device 14 (the PP brake torque TRpp) is adjusted based on the required deceleration force and the state information on the brake device 12 and the power plant device 14.

When the determination part 63 determines that an abnormality has occurred in the turnability improvement control, the coordinated control part 67 performs a coordinated control in which a sum of the brake deceleration force (the ESB brake torque TResb) and the power plant deceleration force (the PP brake torque TRpp) is degenerated according to a prescribed time rate of change.

In the vehicle control apparatus 11 according to the first aspect of the present invention, the first information acquisition part 61 acquires the state information on the brake device 12 and the power plant device 14 of a host vehicle, and the vehicle state information including information on front wheel steering angle thereof. The determination part 63 determines whether or not an abnormality has occurred in a turnability improvement control including a control over the brake device 12 or the power plant device 14. The deceleration force computation part 65 computes a required deceleration force to be generated in the vehicle based on the vehicle state information. The coordinated control part 67 performs a coordinated control in which a distribution ratio between the brake deceleration force of the brake device 12 (the ESB brake torque TResb) and the power plant deceleration force of the power plant device 14 (the PP brake torque TRpp) is adjusted based on the required deceleration force and the state information on the brake device 12 and the power plant device 14.

When the determination part 63 determines that an abnormality has occurred in the turnability improvement control including a control over the brake device 12 or the power plant device 14, the coordinated control part 67 performs a coordinated control in which a sum of the ESB brake torque TResb and the PP brake torque TRpp is degenerated according to a prescribed time rate of change.

The terms "a sum of the ESB brake torque TResb and the PP brake torque TRpp is degenerated according to a prescribed time rate of change" used herein means that the sum of the ESB brake torque TResb and the PP brake torque TRpp is gradually converged to zero according to the prescribed time rate of change.

In the vehicle control apparatus 11 according to the first aspect of the present invention, when the determination part 63 determines that an abnormality has occurred in the turnability improvement control including a control over the brake device 12 or the power plant device 14, the coordinated control part 67 performs the coordinated control in which the sum of the ESB brake torque TResb and the PP brake torque TRpp is degenerated according to the prescribed time rate of change. Thus, even when an abnormality has occurred in the brake device 12 or the power plant device 14 of the vehicle during execution of the turnability improvement control, the vehicle control apparatus 11 can quickly suppress disturbance in behavior of the vehicle and realize a smooth vehicle control without making an occupant (s) of the vehicle feel uncomfortable owing to an abrupt reduction in deceleration, an unnecessary deceleration, a change in turning characteristics different from those in normal state accompanied by any of the formers, or the like.

The vehicle control apparatus 11 according to a second aspect of the present invention is the vehicle control apparatus 11 according to the first aspect of the present invention and has a configuration in which, when the determination part 63 determines that an abnormality has occurred in the turnability improvement control, the coordinated control part 67 performs a coordinated control in which: a deceleration force selected from the group consisting of the ESB brake torque TResb and the PP brake torque TRpp is degenerated according to a time rate of change; during the degeneration of the selected deceleration force according to the time rate of change, the other deceleration force is held; and, after the selected deceleration force is converged to zero by the degeneration, the other deceleration force is degenerated according to the time rate of change.

In the vehicle control apparatus 11 according to the second aspect of the present invention, the coordinated control part 67 is thus has a configuration in which, when the determination part 63 determines that an abnormality has occurred in the turnability improvement control, the coordinated control part 67 performs the coordinated control in which: a deceleration force selected from the group consisting of the ESB brake torque TResb and the PP brake torque TRpp is degenerated according to a time rate of change; during the degeneration of the selected deceleration force according to the time rate of change, the other deceleration force is held; and, after the selected deceleration force of has been converged to zero by the degeneration, the other deceleration force is degenerated according to the time rate of change.

Let us assume a case in which both the ESB brake torque TResb and the PP brake torque TRpp are degenerated simultaneously. In such a configuration, it is required to monitor respective states of the degeneration of the ESB brake torque TResb and the PP brake torque TRpp each other on a real-time basis. In that case, a complicated management for a real-time mutual monitoring of the degenerated states of the two deceleration forces so as to secure respective degeneration amounts of the deceleration forces in the degeneration zone of the turnability improvement control.

Thus, the vehicle control apparatus 11 according to the second aspect of the present invention is configured such that, when the determination part 63 determines that an abnormality has occurred in a turnability improvement control, the coordinated control part 67 performs the coordinated control in which: a deceleration force selected from the group consisting of the ESB brake torque TResb and the PP brake torque TRpp is degenerated according to a time rate of change; and, after completion of the degeneration of the selected deceleration force, the other deceleration force is degenerated according to the time rate of change.

In the configuration described above, in order to ensure the degeneration amounts of the deceleration forces in the degeneration zone of the turnability improvement control, it becomes sufficient to monitor only one of the degenerated states of the ESB brake torque TResb and the PP brake torque TRpp. This can reduce load of information management, compared with the case in which respective degenerated states of the two degenerated states are monitored each other on a real-time basis.

The vehicle control apparatus 11 according to the second aspect of the present invention is configured such that, when the determination part 63 determines that an abnormality has occurred in a turnability improvement control, the coordinated control part 67 performs the coordinated control in which: a deceleration force selected from the group consisting of the ESB brake torque TResb and the PP brake torque TRpp is degenerated according to a time rate of change; and, after completion of the degeneration of the selected deceleration force, the other deceleration force is degenerated according to the time rate of change. This can reduce load of information management, compared with the case in which respective degenerated states of the two degenerated states are monitored each other on a real-time basis.

The vehicle control apparatus 11 according to a third aspect of the present invention is the vehicle control apparatus 11 according to the second aspect of the present invention and has a configuration in which, when the determination part 63 determines that an abnormality has occurred in a turnability improvement control, the coordinated control part 67: monitors whether or not a deceleration force selected from the group consisting of the ESB brake torque TResb and the PP brake torque TRpp is degenerated according to a time rate of change; when the selected deceleration force is being degenerated according to the time rate of change, holds the other deceleration force; and, when the selected deceleration force is being degenerated not according to the time rate of change, makes the other deceleration force degenerate to compensate for a difference between the deceleration forces according to and not according to the time rate of change.

In the vehicle control apparatus 11 according to the third aspect of the present invention, when the determination part 63 determines that an abnormality has occurred in the turnability improvement control and when a deceleration force selected from the group consisting of the ESB brake torque TResb and the PP brake torque TRpp is being degenerated not according to the time rate of change, then the coordinated control part 67 performs a coordinated control such that the other deceleration force is degenerated to compensate for a difference between the deceleration forces according to and not according to the time rate of change. More specifically, for example, when the selected deceleration force is being degenerated at a rate lower than the time rate of change, the coordinated control part 67 performs the coordinated control such that the other deceleration force is degenerated to compensate for an inappropriate deceleration force caused by the lower time rate of change.

In the vehicle control apparatus 11 according to the third aspect of the present invention, when the determination part 63 determines that an abnormality has occurred in the turnability improvement control and when a deceleration force selected from the group consisting of the ESB brake torque TResb and the PP brake torque TRpp is being degenerated not according to the time rate of change, then the coordinated control part 67 performs the coordinated control such that the other deceleration force is degenerated to compensate for a difference between the deceleration forces according to and not according to the time rate of change. This makes it possible to appropriately secure respective degeneration amounts of the deceleration forces in the degeneration zone of the turnability improvement control, compared with the vehicle control apparatus 11 according to the second aspect of the present invention, even when the selected deceleration force is being degenerated, not according to the time rate of change.

In the meantime, a brake deceleration force of the brake device 12 (ESB brake torque TResb) is superior to a power plant deceleration force of the power plant device 14 (PP brake torque TRpp) in general versatility (with a wider usage). The former is, however, inferior to the latter in responsiveness, serviceability, and performance of keeping an appropriate vehicle attitude. There is thus a need to preferentially use the PP brake torque TRpp, rather than the ESB brake torque TResb.

Thus, the vehicle control apparatus 11 according to a fourth aspect of the present invention is the vehicle control apparatus 11 according to any one of the first to third aspects of the present invention and has a configuration in which: the selected deceleration force selected from the group consisting of the ESB brake torque TResb and the PP brake torque TRpp is the brake deceleration force (the ESB brake torque TResb); and the other deceleration force is the power plant deceleration force (the PP brake torque TRpp).

In the vehicle control apparatus 11 according to the fourth aspect of the present invention, not the ESB brake torque TResb but the PP brake torque TRpp is preferentially used (an increased time of using the PP brake torque TRpp). Positive effects in responsiveness, serviceability, and performance of keeping an appropriate vehicle attitude can be thus expected, compared with a case in which not the PP brake torque TRpp but the ESB brake torque TResb is preferentially used.

The vehicle control apparatus 11 according to a fifth aspect of the present invention is a vehicle control apparatus 11 that performs a control over the brake device 12 or the power plant device 14 of a host vehicle. The vehicle control apparatus 11 includes: an information acquisition part (which may also be referred to as the first information acquisition part 61) configured to acquire information on state of the brake device 12 and the power plant device 14 of the vehicle, and information on vehicle state including that on front wheel steering angle thereof; the determination part 63 configured to determine whether or not an abnormality occurs in a turnability improvement control including a control over the brake device 12 or the power plant device 14; the deceleration force computation part 65 configured to compute a required deceleration force to be generated in the vehicle based on the state information; and the coordinated control part 67 configured to perform a coordinated control in which a distribution ratio between a brake deceleration force of the brake device 12 (the ESB brake torque TResb) and a power plant deceleration force of the power plant device 14 (the PP brake torque TRpp) is adjusted based on the required deceleration force and the state information on the brake device 12 and the power plant device 14.

When the determination part 63 determines that an abnormality has occurred in the turnability improvement control, the coordinated control part 67 performs a coordinated control in which a sum of the brake deceleration force (the ESB brake torque TResb) and the power plant deceleration force (the PP brake torque TRpp) is degenerated according to a prescribed time rate of change.

In the coordinated control, the ESB brake torque TResb selected from the group consisting of the brake deceleration force (the ESB brake torque TResb) and the power plant deceleration force (the PP brake torque TRpp) is degenerated according to the time rate of change; while the ESB brake torque TResb is being degenerated according to the time rate of change, a value is held as the PP brake torque TRpp which is obtained at a time when the abnormality is determined to have occurred in the turnability improvement control; and, when the ESB brake torque TResb has converged to zero by the degeneration, the PP brake torque TRpp is degenerated according to the time rate of change, starting at a point of time at which the ESB brake torque TResb has converged to zero.

In the vehicle control apparatus 11 according to the fifth aspect of the present invention, the ESB brake torque TResb selected from the group consisting of the brake deceleration force (the ESB brake torque TResb) and the power plant deceleration force (the PP brake torque TRpp) is degenerated according to the time rate of change; while the ESB brake torque TResb is being degenerated according to the time rate of change, a value is held as the PP brake torque TRpp which is obtained at a time when the abnormality is determined to have occurred in the turnability improvement control; and, when the PP brake torque TRpp has converged to zero by the degeneration, the PP brake torque TRpp is degenerated according to the time rate of change, starting at a point of time at which the PP brake torque TRpp has converged to zero. This makes it possible to quickly suppress disturbance in behavior of the host vehicle, even when an abnormality has occurred in a control over the brake device 12 or the power plant device 14 of the vehicle during execution of the turnability improvement control.

Also in the vehicle control apparatus 11 according to the fifth aspect of the present invention, not the ESB brake torque TResb but the PP brake torque TRpp is preferentially used (an increased time of using the PP brake torque TRpp). Positive effects in responsiveness, serviceability, and performance of keeping an appropriate vehicle attitude can be thus expected, compared with a case in which not the PP brake torque TRpp but the ESB brake torque TResb is preferentially used.

OTHER EMBODIMENTS

A plurality of the embodiments described above each illustrate an example of implementation of the present invention. Therefore, those embodiments should not be construed as limiting the technical scope of the present invention. The present invention can be carried out in various forms without departing from the gist or main features of the present invention.

For example, in the explanation of the vehicle control apparatus 11 according to the embodiment of the present invention, the coordinated control part 67 of the first ECU 51 is described as a way of illustration to have a function of performing such a coordinated control that a sum of the brake deceleration force and the power plant deceleration force be degenerated according to a prescribed time rate of change. The present invention is not, however, limited to the example.

In the present invention, the coordinated control part 67 of the first ECU 51 may be configured to perform such a coordinated control that a required deceleration force that is a sum of the brake deceleration force and the power plant deceleration force and is also a result computed by the deceleration force computation part 65 be degenerated according to a prescribed time rate of change.

The present invention may adopt a configuration in which, in place of the coordinated control part 67 of the first ECU 51, the vehicle control apparatus 11 itself has the function of performing a coordinated control. In this case, the vehicle control apparatus 11 itself may be referred to as a coordinated control part of the present invention. The present invention is not, however, limited to this example.

The present invention may have a configuration in which three ECUs, namely, the first ECU 51, the second ECU 53, and the third ECU 55, are used in coordination with each other to perform the coordinated control described above. In this case, a combination of the three ECUs of the first ECU 51, the ECU 53, and the third ECU 55 may be referred to as a coordinated control part of the present invention.

Lastly, in the explanation of the vehicle control apparatus 11 according to the embodiment of the present invention, the power plant device 14 is described by giving an example in which the present invention is applied to an electric vehicle equipped with the motor generator 59 or the like. The present invention is not, however, limited to the example.

The present invention may be applied to a hybrid vehicle equipped with an internal combustion engine and the motor generator 59 as the power plant device 14.

DESCRIPTION OF REFERENCE NUMERALS 11 vehicle control apparatus
12 brake device
14 power plant device
61 first information acquisition part (information acquisition part)
63 determination part
65 deceleration force computation part
67 coordinated control part
TResb ESB brake torque (brake deceleration force)
TRpp PP brake torque (power plant deceleration force)

The invention claimed is:

1. A vehicle control apparatus that provides control over a brake device and a power plant device of a host vehicle, comprising:
   a first electronic control unit (ECU) configured to:
      acquire vehicle state information which includes information on state of the brake device and the power plant device and information on front wheel steering angle of the host vehicle;
      determine whether or not an abnormality has occurred in a turnability improvement control including a control over the brake device or the power plant device;
      compute a required deceleration force to be generated in the host vehicle, based on the vehicle state information; and
      perform a coordinated control in which a distribution between a brake deceleration force of the brake device and a power plant deceleration force of the power plant device is adjusted based on the required deceleration force and the state information on the brake device and the power plant device,
   wherein, when it is determined that an abnormality has occurred in the turnability improvement control, the first ECU performs a coordinated control such that a sum of the brake deceleration force and the power plant deceleration force is degenerated according to a prescribed time rate of change.

2. The vehicle control apparatus according to claim 1,
   wherein, when it is determined that the abnormality has occurred in the turnability improvement control, the first ECU performs the coordinated control in which the first ECU is configured to:
   make one of deceleration forces selected from a group consisting of the brake deceleration force and the power plant deceleration force degenerated according to the prescribed time rate of change and hold the other non-selected deceleration force during the degeneration of the selected deceleration force according to the prescribed time rate of change; and
   when the selected deceleration force has converged to zero by the degeneration, make the other non-selected deceleration force degenerated according to the prescribed time rate of change.

3. The vehicle control apparatus according to claim 2,
   wherein, when it is determined that an abnormality has occurred in the turnability improvement control, the first ECU performs a coordinated control in which the first ECU is configured to:
   monitor whether or not the selected deceleration force is being degenerated according to the prescribed time rate of change;
   when the selected deceleration force is determined to be being degenerated according to the prescribed time rate of change, hold the other non-selected deceleration force; and
   when the selected deceleration force is not determined to be being degenerated according to the prescribed time rate of change, make the other non-selected deceleration force degenerated so as to compensate for a difference between the possible selected deceleration forces according to the prescribed time rate of change and the actual selected deceleration force not according to the prescribed time rate of change.

4. The vehicle control apparatus according to claim 3,
   wherein the selected deceleration force is the brake deceleration force, and the other non-selected deceleration force is the power plant deceleration force.

5. The vehicle control apparatus according to claim 2, wherein the selected deceleration force is the brake deceleration force, and the other non-selected deceleration force is the power plant deceleration force.

6. A vehicle control apparatus that provides control over a brake device and a power plant device of a host vehicle, comprising:
  a first electronic control unit (ECU) configured to:
    acquire vehicle state information which includes information on state of the brake device and the power plant device and information on front wheel steering angle of the host vehicle;
    determine whether or not an abnormality has occurred in a turnability improvement control including a control over the brake device and the power plant device;
    compute a required deceleration force to be generated in the host vehicle, based on the vehicle state information; and
    perform a coordinated control in which a distribution between a brake deceleration force of the brake device and a power plant deceleration force of the power plant device is adjusted based on the required deceleration force and the state information on the brake device and the power plant device,
  wherein, when it is determined that an abnormality has occurred in the turnability improvement control, the first ECU performs a coordinated control such that a sum of the brake deceleration force and the power plant deceleration force is degenerated according to a prescribed time rate of change, and
  wherein, in the coordinated control, the first ECU is configured to
    make the brake deceleration force selected from a group consisting of the brake deceleration force and the power plant deceleration force degenerated according to the prescribed time rate of change, and hold a value obtained at a point of time at which the abnormality is determined to have occurred in the turnability improvement control, as the power plant deceleration force, while the brake deceleration force is being degenerated according to the prescribed time rate of change; and
    when the brake deceleration force has converged to zero by the degeneration, make the power plant deceleration force degenerated according to the prescribed time rate of change, starting at a point of time at which the brake deceleration force has converged to zero.

* * * * *